(No Model.)  2 Sheets—Sheet 1.

P. LINCOLN.
SULKY PLOW, SEEDER, AND CULTIVATOR.

No. 287,034.  Patented Oct. 23, 1883.

Witnesses.
A. Ruppert.
H. A. Daniels.

Inventor:
Peries Lincoln.
by H. J. England. Atty.

(No Model.) 2 Sheets—Sheet 2.

P. LINCOLN.
SULKY PLOW, SEEDER, AND CULTIVATOR.

No. 287,034. Patented Oct. 23, 1883.

Witnesses.
A. Ruppert.
H. A. Daniels

Inventor:
Peries Lincoln
by H. J. England Atty.

UNITED STATES PATENT OFFICE.

PERIES LINCOLN, OF COLDWATER, MICHIGAN.

SULKY PLOW, SEEDER, AND CULTIVATOR.

SPECIFICATION forming part of Letters Patent No. 287,034, dated October 23, 1883.

Application filed April 27, 1883. (No model.)

*To all whom it may concern:*

Be it known that I, PERIES LINCOLN, a citizen of the United States, residing at Coldwater, in the county of Branch and State of Michigan, have invented certain new and useful Improvements in Sulky Plows, Seeders, Cultivators, &c., of which the following is a specification, reference being had therein to the accompanying drawings.

My invention relates to certain new and useful improvements in sulky plows and seeders combined, wherein the same axle, wheels, and frame are made to carry and operate said plows, cultivators, seeders, &c.

The object of my invention is to construct a carriage or vehicle by which a number of farm implements can be combined and operated at one and the same time, or that each separate implement attached to said vehicle can be operated separately.

Another object of my invention is to so arrange the parts in its construction that the various implements connected to the same may be readily adjusted to any required position, and the said implements may be lifted from the soil, suspended on or beneath said vehicle, and readily transported to and from the field, or to any place desired for use.

Another object is to combine a series of farm implements that are generally used in succession—that is, plows, furrow-openers, seeders, drags, and rollers—in such a manner that all (or nearly all) of said implements can be used at the same time, connected to the axle and sulky-frame, and successfully operated by a single person occupying the driver's seat and at the same time driving the team.

By means of my improved device I am enabled to group together and connect to a single frame, axle, and a pair of wheels a number of farm implements, and while so connected successfully operate them by a single attendant.

I attain these objects by means of the following construction and arrangement of the various parts, which will be more fully pointed out and described in the specification and claims, forming, with the drawings, this application.

Figure 1:
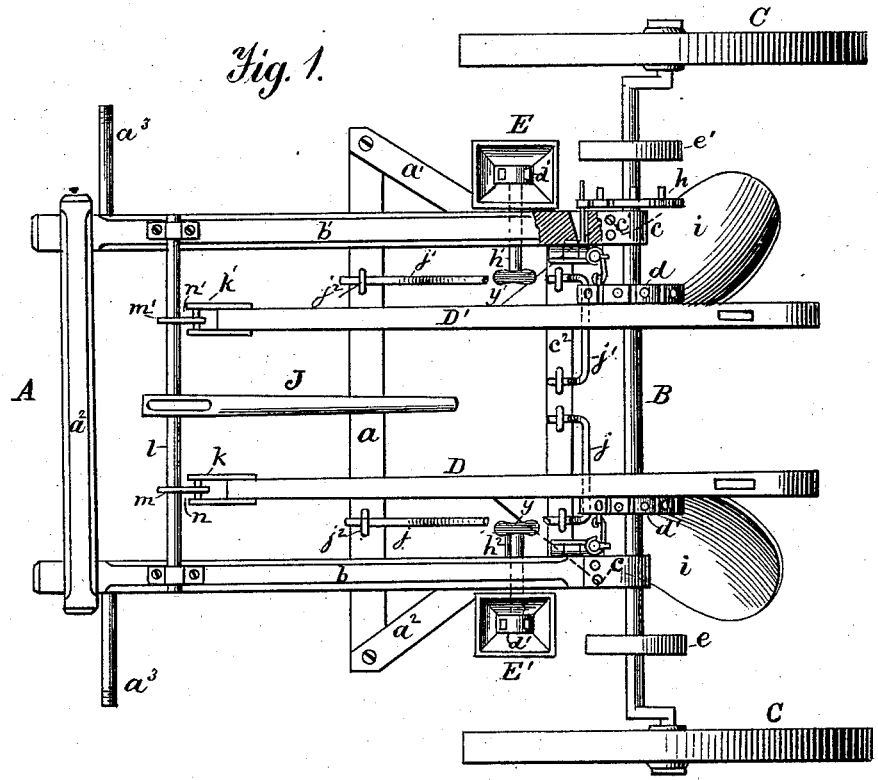
Figure 2:
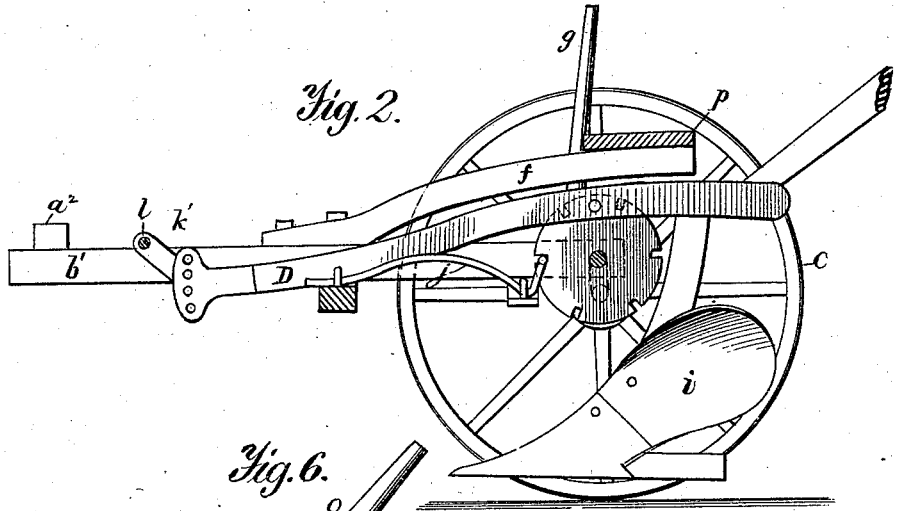
Figure 6:
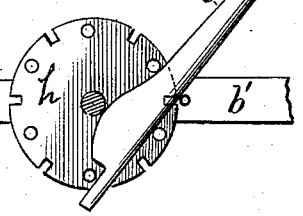
Figure 3:
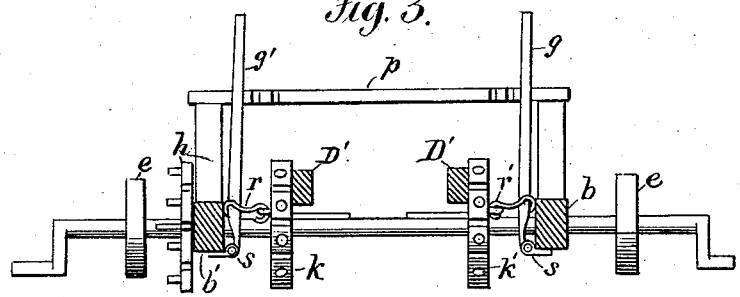
Figure 4:
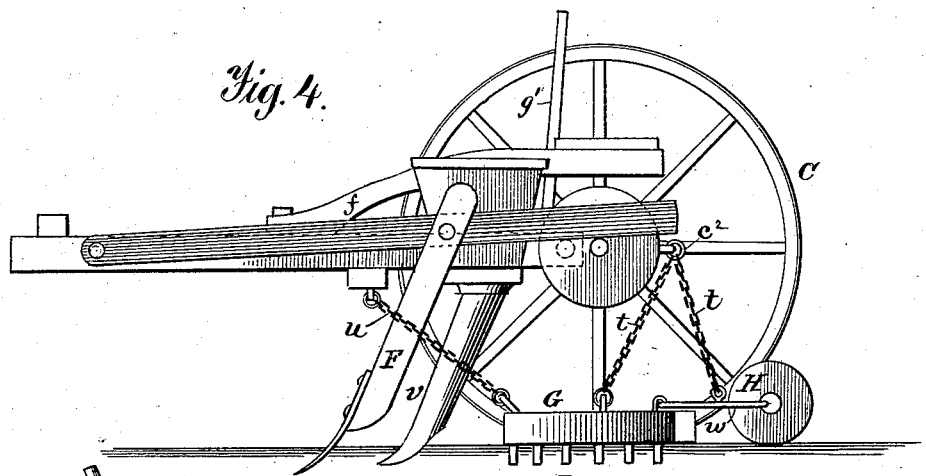
Figure 5:
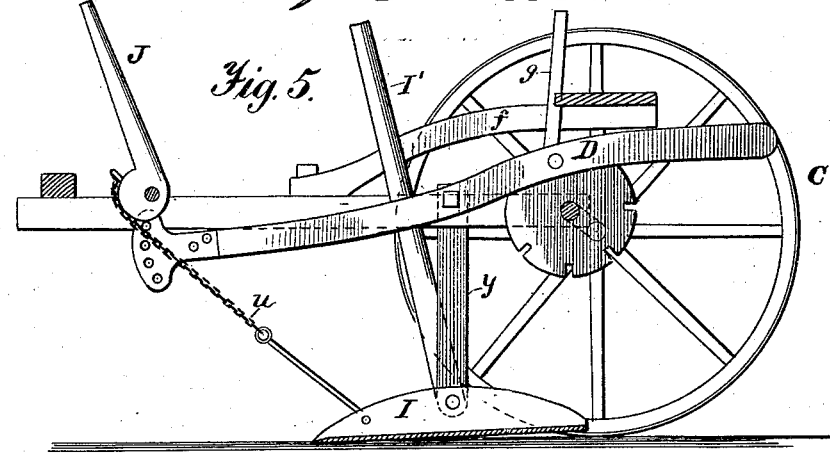

Referring to the drawings, Figure 1 is a plan view of my invention, showing the wheels, axle, frame, with farm implements, and their connections with axle and frame. Fig. 2 is a longitudinal and sectional view of the same, showing plow connected to frame and raised above the earth or soil for transportation to and from the field. Fig. 3 is a vertical cross-section, showing lifting-wheels, levers, and their connections. Fig. 4 is a longitudinal sectional view with implements attached. Fig. 5 is a longitudinal section, showing scraper, plow-beam, and levers. Fig. 6 is a detail view, showing wheel for operating axle with lever.

Similar letters refer to similar parts throughout the drawings.

Referring to the drawings, A represents a frame having a front cross-bar, $a^2$, near which, and attached to the frame and projecting outward, are two short axles or axle-arms, $a^3$ $a^3$, for the purpose of attaching wheels when desired for use.

On top of frame A, and a short distance inward, is journaled a rock-shaft, $l$, rigidly secured to the center of which is a working-lever, J, and on side of said lever J the outer ends of plow-beams D and D' are attached by means of lifting-arms $m$ and $m'$, said arms being rigidly secured at one end to rock-shaft $l$, and their opposite ends to pivoted cross-bars $n$ and $n'$, working in clevises $k$ and $k'$, the inner ends of said clevises being adjustably attached to said plow-beams D and D', as shown in Figs. 1 and 2. The inner ends of side bars, $b$ and $b'$, are attached to axle B by means of clips or straps $c$ and $c'$. Said straps loosely encircle axle B and permit the axle to revolve within the same.

Underneath the frame and at a point about its center is secured a cross-bar, $a$. From the outer ends of said arm braces $a'$ and $a^2$ extend inward to the frame, and their inner ends are secured to side bars, $b$ and $b'$, as shown in Fig. 1.

On the under sides of side bars, $b$ and $b'$, near the inner ends of clips $c$ and $c'$, is secured a cross-bar, $c^2$, on which are pivoted the pawls or foot-levers $j$ and $j'$. Said pawls extend outward to cross-bar $a$, and pass under staples $j^2$ $j^2$, placed in the top of said cross-bar $a$.

On the outside of each side bar, $b$ and $b'$, are secured seed-hoppers E and E', having extension-feet or discharge-tubes V V. The inside of said seed-hoppers are provided with slotted drop-plates $d'$ $d'$. Said plates are attached at their centers to rock-shafts $h'$ $h^2$, the inner ends of said shafts being provided with foot-treadles $y$ and $y^2$, by means of which the operator can, by pressing the heel or toe on the ends of the treadle, alternately drop the requisite amount of seed from the hoppers E and E'.

Axle B is formed of metal, with its outer ends bent in the form of a crank, the outer projecting arms of the same forming the axle-arms, on which wheels C revolve.

Between the clips $c$ and $c'$ and the wheels are rigidly secured wheels $e$ and $e'$, having eye-bolts $e^2$, to which the inner end of chains $t$ $t$ are attached, as shown in Fig. 4, the purpose of which is to raise the drag, roller, or other implement attached to the outer end of said chains.

On the inside of clips $c$ and $c'$ and near plow-beams D and D' are loosely secured to axle B wheels $d$ and $d'$, the peripheries of which are cross grooved or notched for the reception of the bent pawls $j$ and $j'$, by which said axle B is held in any position required when transporting or using the implements.

Between wheel $e'$ and clip $c'$ is rigidly secured to axle B a lifting-wheel, $h$, formed with side projections, between which lever $o$ is placed when operating the same, as shown at Fig. 6.

Two upright levers, $g$ and $g'$, are attached to the under sides of side bars, $b$ and $b'$, near axle B, by hinges $s$. Connecting-links $r'$ and $r$ connect levers $g$ and $g'$ with wheels $d$ and $d'$. The purpose of said levers is to move wheels $d$ and $d'$ laterally on shaft or axle B. Spring-arms $f$ are secured at their feet by bolts to side bars, $b$ and $b'$, and across the upper face of their rear ends a seat, $p$, is secured, said seat having notches in its inner edge for the reception of the arms of levers $g$ and $g'$, as shown in Fig. 3.

For the purpose of raising the implements used—such as plows, cultivators, &c.—higher than the peripheries of wheels $d$ and $d'$, a standard, $y$, is secured by its upper end to plow-beam D, and the lower end to a scraper, I. A chain, $u$, connects the front end of scraper I to lever J, by means of which the point of said scraper is raised or lowered from the soil. An operating-handle, I', extends upward, by which said scraper is operated. Drag G and roller H are connected to each other by means of a metal link, $w$, as shown in Fig. 4. Plows $i$ and $i'$ are attached to beams D and D', as shown in Figs. 1 and 2.

Having thus described my invention, the operation of the same is as follows: Power is attached to the front of the frame, the implements are attached as shown in Fig. 4, when the furrow is opened, seed dropped, the soil dragged over the seed, and then pulverized and smoothed over by the roller, when the various operations are complete by once moving over the soil.

Having thus described my invention, what I desire to secure by Letters Patent is—

1. The combination of the bent axle B, carrying grooved wheels $d$ and $d'$, the side bars, $b$ and $b'$, and the notched cross-bar $p$, with the levers $g$ and $g'$, hinges $s$, the connecting-links $r$ and $r'$, and the bent operating-rods $j$ and $j'$, all arranged and operated as shown.

2. In a sulky-plow, the combination of the frame A, having projecting axle-arms $a^3$, and loose clips $c$, the bent axle B, carrying grooved wheels $a$ and $a'$, and the wheel $h$, having projecting pins for the reception of lever $o$, and the seed-boxes E and E', with the foot-treadles $y'$, the bent operating-rods $j$ and $j'$, and the levers $g$ and $g'$, all arranged and operated substantially as shown.

In testimony whereof I affix my signature in presence of two witnesses.

PERIES LINCOLN.

Witnesses:
CHARLES P. LINCOLN,
M. P. LINCOLN.